US 7,044,461 B2

(12) United States Patent
Vestel et al.

(10) Patent No.: US 7,044,461 B2
(45) Date of Patent: May 16, 2006

(54) METHOD AND APPARATUS FOR ADJUSTABLY INDUCED BIAXIAL STRAIN

(75) Inventors: Michael J. Vestel, San Francisco, CA (US); Daryl Patrick Oshatz, Oakland, CA (US)

(73) Assignee: The Regents of the University of California, Oakland, CO (US)

( * ) Notice: Subject to any disclaimer, the term of this patent is extended or adjusted under 35 U.S.C. 154(b) by 153 days.

(21) Appl. No.: 10/837,027

(22) Filed: Apr. 30, 2004

(65) Prior Publication Data

US 2005/0005705 A1   Jan. 13, 2005

Related U.S. Application Data

(60) Provisional application No. 60/467,163, filed on Apr. 30, 2003.

(51) Int. Cl.
  *B23Q 3/00* (2006.01)
  *G01D 1/16* (2006.01)
  *G01D 7/02* (2006.01)

(52) U.S. Cl. ......................................... 269/287; 73/789
(58) Field of Classification Search ................ 269/287; 73/789
   See application file for complete search history.

(56) References Cited

U.S. PATENT DOCUMENTS

| | | | | |
|---|---|---|---|---|
| 4,281,841 A | * | 8/1981 | Kim et al. ................... | 277/625 |
| 4,537,406 A | * | 8/1985 | Hirasuna et al. ............. | 277/314 |
| 4,888,663 A | * | 12/1989 | Longerich et al. .......... | 361/699 |
| 4,899,543 A | | 2/1990 | Romanelli et al. | |
| 4,903,603 A | * | 2/1990 | Longerich et al. .......... | 102/293 |
| 4,922,381 A | * | 5/1990 | Longerich et al. .......... | 361/792 |
| 4,934,743 A | * | 6/1990 | Kapgan et al. ............... | 285/23 |
| 5,787,104 A | * | 7/1998 | Kamiyama et al. ........ | 372/43.01 |
| 6,326,638 B1 | * | 12/2001 | Kamiyama et al. ........... | 257/13 |
| 6,367,250 B1 | | 4/2002 | Baumbick | |
| 6,547,803 B1 | | 4/2003 | Seward et al. | |
| 6,663,821 B1 | | 12/2003 | Seward | |
| 6,717,056 B1 | * | 4/2004 | Rivelli et al. ............. | 174/102 R |
| 6,861,672 B1 | * | 3/2005 | Kamiyama et al. ........... | 257/79 |
| 2001/0039449 A1 | * | 11/2001 | Johnson et al. ............. | 623/1.19 |
| 2002/0054616 A1 | * | 5/2002 | Kamiyama et al. ........... | 372/45 |

(Continued)

FOREIGN PATENT DOCUMENTS

DE      4243213 C1 *  1/1994

(Continued)

OTHER PUBLICATIONS

Wellman, P.S., et al.; Mechanical Design and Control of a High Bandwidth Shape Memory Alloy Tactile Display, 1997 International Smposium on Experimental Robotics, Barcelona, Spain, Jun. 1997, 12 pps.

(Continued)

*Primary Examiner*—David E. Graybill
(74) *Attorney, Agent, or Firm*—Joseph R. Milner

(57) ABSTRACT

An apparatus comprising a shape memory alloy is configured as a ring shaped sample holder for a transmission electron microscope and imparts uniform biaxial strain on a thin film mounted within. The sample holder responds to a change in temperature by changing the inner diameter, which imparts biaxial strain. In other embodiments, the sample holder is configured to change the inner diameter and change the strain on a thin film reversibly and repeatedly. In further embodiments, the sample holder is non circular. In still further embodiments, the apparatus is configured as a prime mover of a reversible radial actuator. Methods for making and using the apparatus are included in other embodiments.

42 Claims, 10 Drawing Sheets

U.S. PATENT DOCUMENTS

| | | |
|---|---|---|
| 2003/0007236 A1 | 1/2003 | Schachar et al. |
| 2003/0149480 A1* | 8/2003 | Shadduck .................. 623/6.41 |
| 2005/0003571 A1* | 1/2005 | Kamiyama et al. ........... 438/46 |

FOREIGN PATENT DOCUMENTS

| | | | |
|---|---|---|---|
| EP | 255787 A1 | * | 2/1988 |
| EP | 1443175 A1 | * | 8/2004 |
| JP | 63161395 A | * | 7/1988 |
| JP | 06107192 A | * | 4/1994 |
| WO | WO2004092581 A1 | * | 10/2004 |

OTHER PUBLICATIONS

Keats, B. F.;Temperature Compensation for Cavity Resonators Using Shape Memory Alloys, Masters Thesis, University of Waterloo, Ontario, Canada, 2003, 88 pps.

* cited by examiner

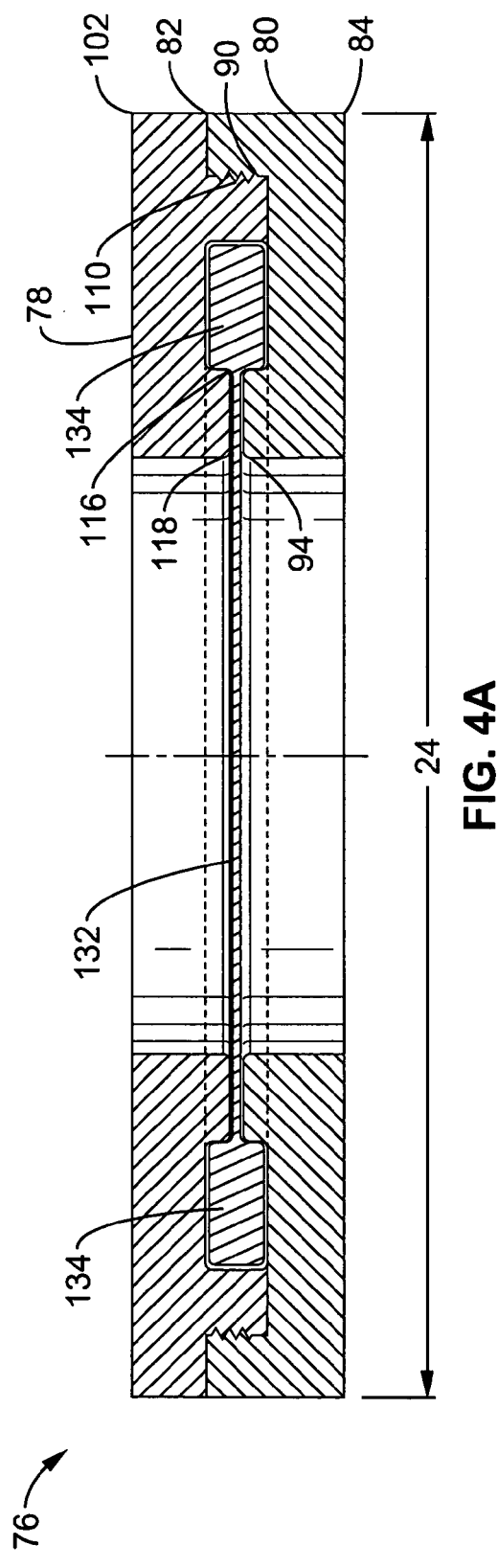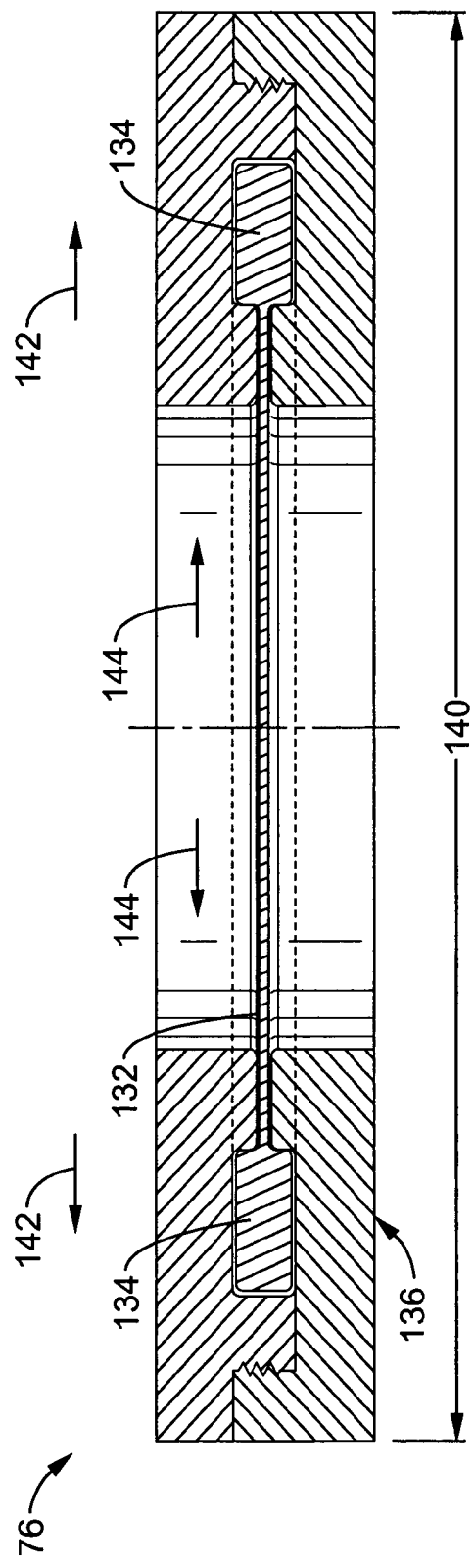
FIG. 4A
FIG. 4B

METHOD AND APPARATUS FOR ADJUSTABLY INDUCED BIAXIAL STRAIN

CROSS-REFERENCE TO RELATED APPLICATIONS

This application claims priority from U.S. provisional application Ser. No. 60/467,163 filed on Apr. 30, 2003, incorporated herein by reference in its entirety.

STATEMENT REGARDING FEDERALLY SPONSORED RESEARCH OR DEVELOPMENT

This invention was made with Government support under Grant No. DE-AC03-76SF00098, awarded by the Department of Energy. The Government has certain rights in this invention.

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains generally to fixtures for inducing strain on a specimen in a transmission electron microscope, and more particularly to an apparatus and methods for inducing biaxial and radial strain on a thin film as a function of change in temperature.

2. Description of Related Art

Measurement of mechanical properties and the identification of deformation mechanisms from direct micro-structural observations of thin films has been done using various experimental techniques. Such techniques present challenging problems because bulk methods such as uniaxial tension testing, are very difficult to apply directly to films. Difficulties include generating forces and strains required in a small space, gripping the film, and prevention of bending force components in the film. While micro-electromechanical uniaxial strain fixtures have been fabricated, the approach does not generate the state of strains and stresses seen in chemical and biological micro-sensors, micro-actuators, passivation layers, micro-electronics, data storage and other film-based devices. The stress states that develop in these devices, whether intrinsic or extrinsic, are typically biaxial, plane-stress in nature. Bulge testing has been used to evaluate the biaxial modulus of thin films, but this method requires elaborate hardware to induce a state of stress that is generally biaxial but still varies across the bulged sample. In addition, it is infeasible to install the complex bulge test apparatus inside the five cubic millimeter volume and vacuum environment of a Transmission Electron Microscope (TEM) objective lens.

Inducing radial strain through direct thermal expansion for observation of a thin film by a TEM is infeasible. For example a stainless steel ring would need to be heated to a temperature of nearly 3,000 deg. C. to achieve a desired expansion, which is a temperature in excess of the melting point of stainless steel.

What is needed is an apparatus that applies uniform, variable biaxial strain on a thin film and is configured to fit within the dimensional restraints and environment of a TEM. An apparatus that applies and releases biaxial strain to thin films in cycles to simulate fatigue for failure analysis is further desirable. An apparatus that allows observation of strain on a freestanding film without a substrate support is also desirable.

BRIEF SUMMARY OF THE INVENTION

The present invention generally comprises an apparatus and method for making and using a sample holder that will induce biaxial strain on a thin film in response to temperature changes. In one embodiment, the sample holder, or fixture, is made from a Shape Memory Alloy (SMA) such as Nickel Titanium (NiTi) alloy. It will be appreciated that one property of an SMA is that it will return to a previously memorized configuration through a phase transformation in response to a change in temperature.

An apparatus, such as a die and a press, is used to reversibly deform a tube of SMA of a first shape to a second shape. A sample holder made from the tube of SMA will retain the second deformed shape until a change of temperature is applied, then the sample holder will return to the previous memorized shape. The range of temperature change necessary to cause a phase transformation depends on the composition of the SMA. This change in shape imparts a biaxial strain on a thin film attached to the sample holder.

In one mode of use, the sample holder is a ring and the change in shape changes the inner perimeter of the ring. In the example of a circular ring, a change in the inner perimeter is also a corresponding change in the inner diameter. In another mode of use, the sample holder is sized to use within the environment of a TEM and, in an exemplary embodiment, can be configured to impart reversible and repeated cycles of biaxial strain in response to temperature changes to the sample holder.

Accordingly, the invention will enable dynamic microstructural characterization of a thin film sample as a function of biaxial strain. Applications for microstructural study include biological microsensors, microactuators, passivation layers, micro-electronics, data storage and other film based devices. In one embodiment, a ring assembly can be expanded and contracted repeatedly. The invention can also be configured as a thermally activated prime mover for a reversible radial actuator, a reversible radial brake, a reversible coupling, or for tuning resonant RF cavities. One application for a reversible radial actuator is in a micro electromechanical system (MEMS).

In one embodiment, an apparatus for adjustably changing biaxial strain on a thin film according to the invention comprises a ring of shape memory alloy that has a first inner perimeter. The ring is reversibly reshaped, resized or otherwise changed in configuration so that it has a second inner perimeter, wherein such reversal to said first inner perimeter is a function of temperature and the shape memory characteristics of the ring. The apparatus includes means for securing a thin film on the ring such that, when the ring adjusts between the second and the first inner perimeter in response to a change in temperature applied to the ring, the biaxial strain on the thin film in turn changes in response to a change between the second and the first inner perimeter of the ring.

Another aspect of the invention is a device where the shape memory alloy comprises Nickel Titanium.

A further aspect of the invention is a means for securing a thin film. In one embodiment, the ring has a top portion and a bottom portion, the top portion has a first continuous groove, the bottom portion has a second continuous groove, and the first continuous groove is adapted to align with the second continuous groove. A means for coupling the top portion and the bottom portion of the ring is provided such that the thin film fits securely between the first continuous groove and the second continuous groove when the top portion and the bottom portion are coupled.

In one embodiment, the first continuous groove in the top portion is configured in a first shape, the second continuous groove in the bottom portion is configured in the first shape, and where the first shape is selected from the group consisting essentially of a circle, an oval and a polygon.

In one embodiment, a plurality of gaskets are adapted to couple to the thin film, where the gaskets are further adapted to fit in the first and second groove, grip the thin film, and the gaskets are configured to change biaxial strain on the thin film in response to a change between the second perimeter and the first perimeter of the ring.

A further aspect of the invention is a means for coupling the top and bottom portions of the ring where in one embodiment the ring has a circular ridge in the top portion of the ring where the circular ridge in the top portion of the ring has male threads, and the ring has a circular recess in the bottom portion of the ring where the circular recess in the bottom portion of the ring has female threads, wherein the male threads on the top portion are adapted to mate with the female threads on the bottom portion, and wherein the top portion of the ring is coupled to the bottom portion of the ring when the male threads are securely engaged with the female threads.

A still further embodiment of the invention has a first continuous recess in the top portion of the ring, and a second continuous recess in the bottom portion of the ring where the first continuous recess of the top portion is adapted to mate with the second continuous recess of the bottom portion of the ring. A counter ring is adapted to align with the first continuous recess in the top portion and the second continuous recess in the bottom portion where the counter ring is further adapted to fit securely between the first and second continuous recesses when the top and bottom portions are coupled. The counter ring is made of shape memory alloy, has a first outer perimeter or shape and has a reversibly changed second outer perimeter or shape where the counter ring reversibly changes from the first outer perimeter to the second outer perimeter in response to changing the temperature of the ring. The ring reversibly changes from the first inner perimeter to the second inner perimeter when the counter ring adjusts between the second and the first outer perimeter in response to changing the temperature of the counter ring.

In one embodiment, the first continuous recess in the top portion is configured in a first shape, the second continuous recess in the bottom portion is configured in the first shape, and the first outer perimeter of the counter ring is configured in the first shape, and where the first shape is selected from the group consisting essentially of a circle, an oval and a polygon.

In a further embodiment of the invention, the counter ring is electrically isolated from the ring, temperature of the ring is changed by applying electric current to the ring, and in the temperature of the counter ring is changed by applying electric current to the counter ring.

A still further aspect of the invention is where the ring is configured to be a prime mover of a reversible radial actuator.

According to another aspect of the invention, in one embodiment the ring has a top surface and a bottom surface, the second inner perimeter of the ring is adapted to hold a removable wax disc, the removable wax disc has at least a top surface, the removable wax disc is temporarily positioned in the second inner perimeter of the ring, and the thin film is deposited on the top surface of the ring and on the top surface of the removable wax disc.

In a further embodiment, a counter ring is adapted to align with the ring, the counter ring is further adapted to couple to the ring, the counter ring is made of shape memory alloy, the counter ring has a first outer perimeter, the counter ring has a reversibly changed second outer perimeter, the counter ring reversibly changes from the first outer perimeter to the second outer perimeter when the ring changes between the second and the first inner perimeter in response to changing temperature of the ring, and the ring reversibly changes from the first inner perimeter to the second inner perimeter when the counter ring changes between the second and the first outer perimeter in response to changing the temperature of the counter ring.

A further aspect of the invention is where the device is adapted to be positioned in a specimen holder of a transmission electron microscope.

A still further aspect of the invention is where the thin film is supported on a substrate, and the substrate coupled to the ring.

Another aspect of the invention is where the first inner perimeter of the ring is up to about five percent larger than the second inner perimeter of the ring.

A further aspect of the invention is where the ring is adapted to be reversibly changed from the first inner perimeter to the second inner perimeter at about room temperature.

A still further aspect of the invention is where the top surface of the ring and the top surface of the removable wax disc are polished, and the thin film is a metal.

A further aspect of the invention is a device for reversibly changing the outer perimeter of a tube of shape memory alloy. In one embodiment, the device comprises a die, where the die has a distal end, a near proximal portion and a proximal end, the die has a bore with a first perimeter and a second perimeter, the second perimeter is smaller than the first perimeter of the bore, the first perimeter of the bore extending from the distal end to the near proximal portion of the die, the second perimeter of the bore is positioned at the proximal end of the die, the bore is tapered between the first perimeter and the second perimeter from the mid proximal portion to the proximal end of the die, and a pressure inducing means is adapted to extrude the tube of shape memory alloy from the distal end of the die, through the bore and through the proximal end of the die, where the outer perimeter of the tube of shape memory alloy is reversibly changed when the tube is inserted in the bore at the distal end of the die and extruded out the proximal end of the die by the pressure inducing means.

In one embodiment, the pressure inducing means comprises a pin that has a distal end, a mid proximal portion and a proximal end, where the pin has a first perimeter and a second perimeter, the first perimeter of the pin corresponds to the first perimeter of the bore, the first perimeter of the pin extends from the distal end of the pin to the mid proximal portion of the pin, the second perimeter of the pin corresponds to the second perimeter of the bore, the second perimeter of the pin extends from the mid proximal portion of the pin to the proximal end of the pin, where the distal end of the pin is further adapted to receive pressure from a press, and where the outer perimeter of the tube of shape memory alloy is reversibly reduced when the tube is inserted in the bore at the distal end of the die, the proximal end of the pin engages the tube, and the tube is extruded out the proximal end of the die by pressure exerted on the pin from the press.

A still further aspect of the invention is a method for inducing a biaxial strain on a thin film. In one embodiment, the method comprises providing a ring of shape memory alloy with a first inner perimeter, reversibly changing the first inner perimeter of the ring to a second inner perimeter, securing a thin film on the ring, changing the temperature of the ring, and inducing biaxial strain on the thin film by adjusting the ring between the second inner perimeter and the first inner perimeter in response to changing the temperature of the ring.

A still further aspect of the invention is a method for reversibly inducing biaxial strain on a thin film. In one embodiment, the method comprises providing a first ring of shape memory alloy with a first inner perimeter, reversibly changing the first inner perimeter of the ring to a second inner perimeter, providing a second ring of shape memory alloy with a first outer perimeter, aligning the first outer perimeter of the second ring to correspond with the second inner perimeter of the first ring, coupling the second ring to the first ring, mounting a thin film on the first ring, changing temperature of the first ring, and inducing biaxial strain on the thin film by adjusting the first ring between the second inner perimeter and the first inner perimeter in response to a change of temperature applied to the first ring.

In another embodiment, the method further comprises adjusting the second ring from the first outer perimeter to a second outer perimeter corresponding with the first perimeter of the first ring and in response to the change of the first ring between the second inner perimeter to the first inner perimeter, applying a change in temperature to the second ring, adjusting the second ring between the second outer perimeter and the first outer perimeter in response to the change of temperature applied to the first ring, and changing the biaxial strain on the thin film by adjusting the first ring between the first inner perimeter and the second inner perimeter in response to the change of the second ring between the second outer perimeter and the first outer perimeter.

A further aspect of the invention is a method for reversibly changing the inner perimeter of a ring device. In one embodiment, the method comprises providing a first ring of shape memory alloy with a first inner perimeter, reversibly changing the first inner perimeter of the ring to a second inner perimeter, providing a second ring of shape memory alloy with a first outer perimeter, aligning the first outer perimeter of the second ring to correspond with the second inner perimeter of the first ring, coupling the second ring to the first ring, changing the temperature of the first ring, changing the first ring between the second inner perimeter and the first inner perimeter in response to changing temperature of the first ring, changing the second ring from the first outer perimeter to a second outer perimeter corresponding with the first perimeter of the first ring and in response to the change of the first ring between the second inner perimeter to the first inner perimeter, changing the temperature of the second ring, changing the second ring between the second outer perimeter and the first outer perimeter in response to the change of temperature applied to the first ring, and changing the first ring between the first inner perimeter and the second inner perimeter in response to the change of the second ring between the second outer perimeter and the first outer perimeter.

Another aspect of the invention is a method for reversibly changing the outer perimeter of a tube of shape memory alloy. In one embodiment, the method comprises providing a die with a tapered bore, a press pin adapted to extrude the tube through the bore, and a press, positioning the cylindrical tube in the tapered bore, and reversibly changing the outer perimeter of the tube by extruding the tube through the tapered bore with pressure from the press on the press pin.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 4A is a cross section view of the two component embodiment of the sample holder shown in FIG. 3 coupled and configured to support a thin film.

FIG. 4B is a cross section view of the sample holder shown in FIG. 4A after a change in diameter induces strain on a thin film.

DETAILED DESCRIPTION OF THE INVENTION

Referring more specifically to the drawings, for illustrative purposes the present invention is embodied in the apparatus generally shown in FIG. 1 through FIG. 10. It will be appreciated that the apparatus may vary as to configuration and as to details of the parts, and that the method may vary as to the specific steps and sequence, without departing from the basic concepts as disclosed herein.

In the context of this invention, a ring of shape memory alloy has an outer perimeter and an inner perimeter. A change in perimeter can be a change in the size of the perimeter, a change in the shape of the perimeter, or both. For example, reducing the inner diameter of a circular ring changes its inner diameter and inner perimeter. Changing a circular ring to an oval ring changes the shape of its inner perimeter and may or may not change the size of its inner perimeter. References to a change in diameter are synonymous with a change in perimeter.

Figure 1:
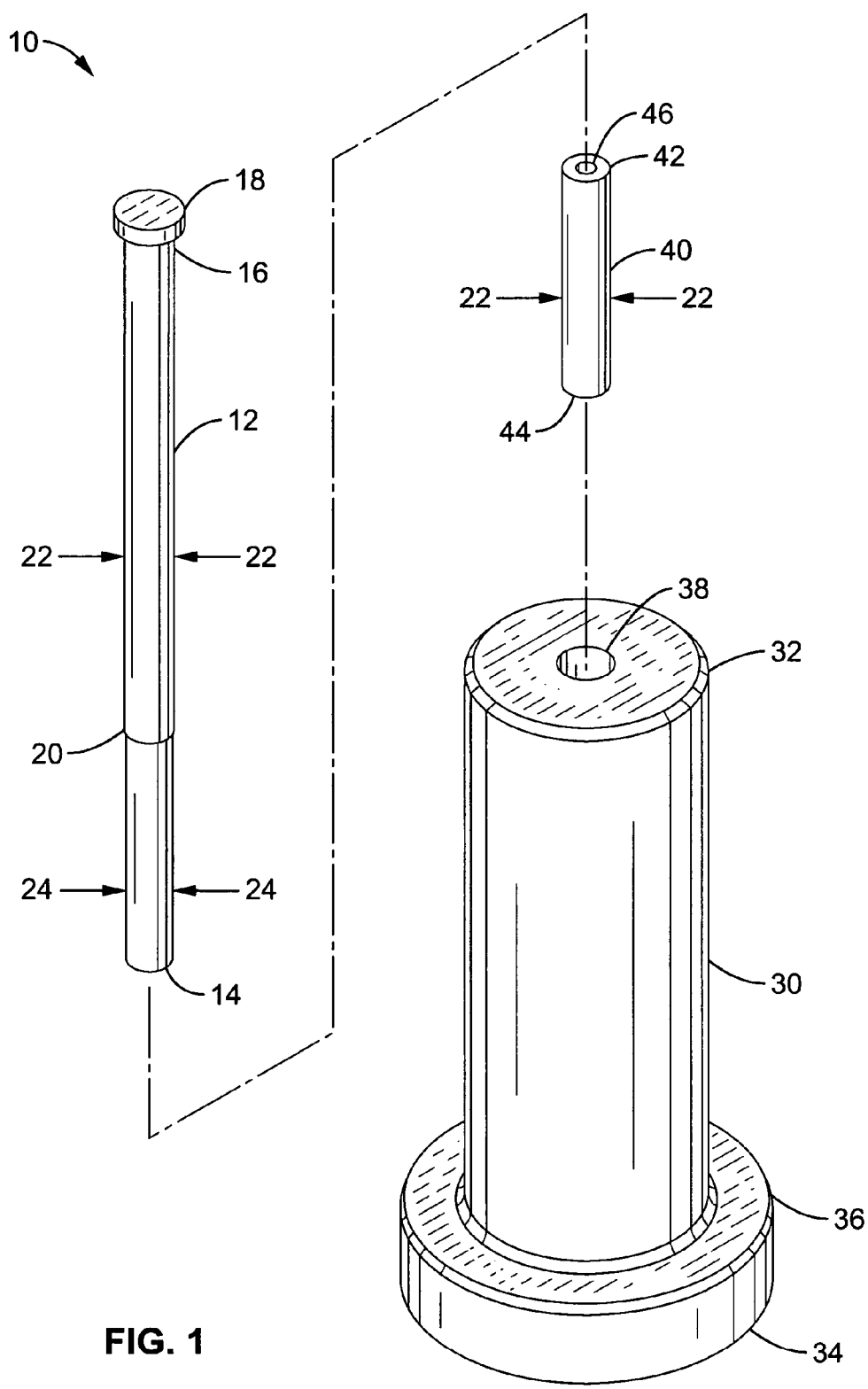
FIG. 1 is a plan view of a constricting die and pin assembly for reducing the diameter of a tube of shape memory alloy.
Figure 2A:
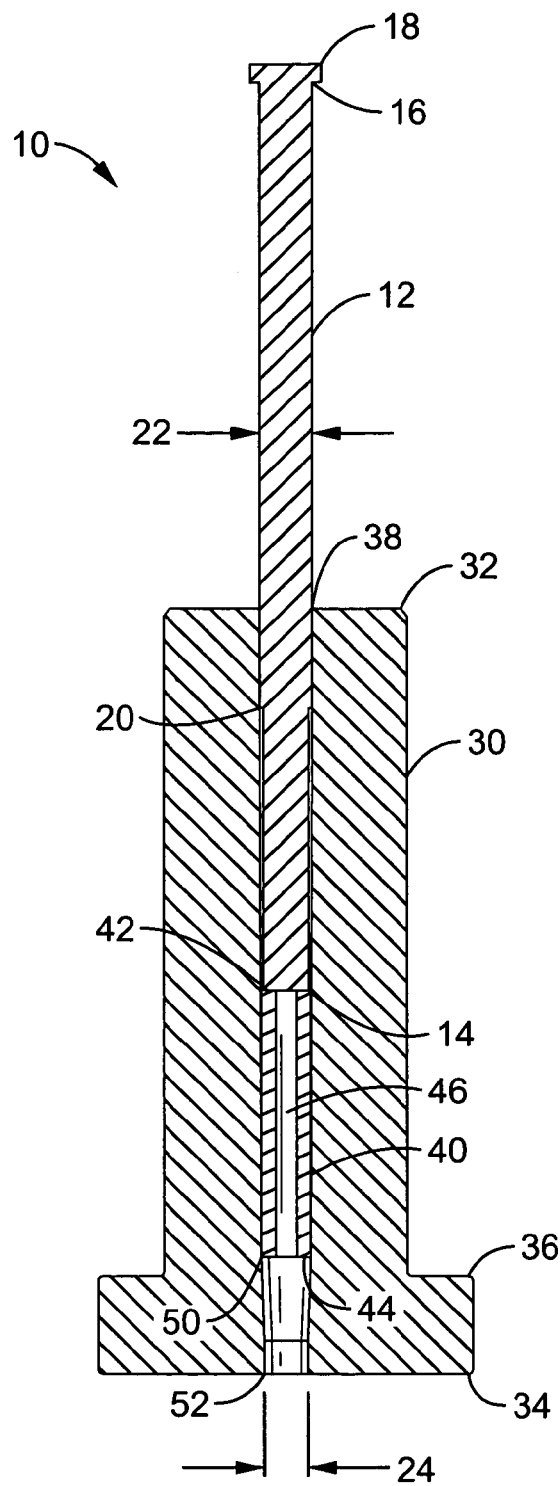
FIG. 2A is a cross section view of the constricting die and pin assembly shown in FIG. 1 with a tube of Shape Memory Alloy (SMA) inserted in the die.
Figure 2B:
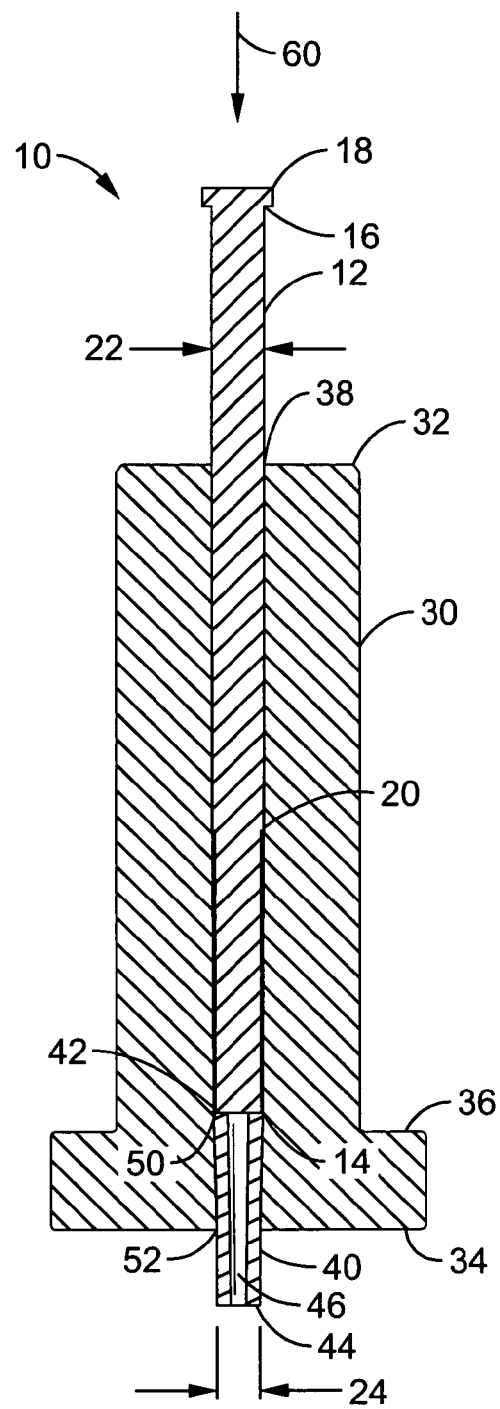
FIG. 2B is a cross section view of the die and pin assembly shown in FIG. 2A extruding a tube of SMA.
Figure 2C:
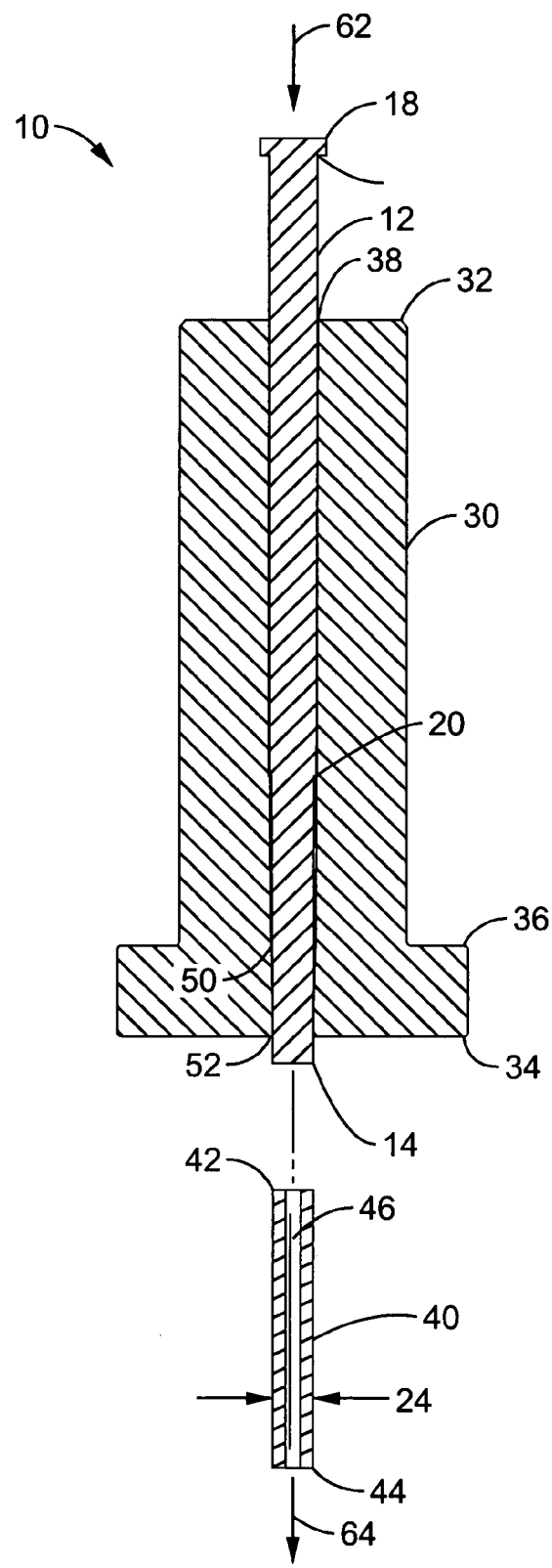
FIG. 2C is a cross section view of the die and pin assembly shown in FIG. 2B with the extruded tube of SMA having a reduced diameter.

FIG. 1 illustrates a plan view, and FIG. 2A through FIG. 2C illustrate a cross section view of an embodiment of a constricting die and pin assembly, generally designated as 10, that can be used in the manufacture of a sample holder or radial actuator.

In FIG. 1, cylindrical press pin 12 has proximal end 14 and distal end 16. Distal end 16 has enlarged end 18 adapted to receive pressure from a press (not shown). Pin 12 also has a mid proximal position 20. The diameter of pin 12 from distal end 16 to mid proximal position 20 is first diameter 22 designated by arrows 22. From mid proximal position 20 to proximal end 14, pin 12 is reduced to a second diameter 24 designated by arrows 24 and described further in FIG. 2A. In one embodiment, press pin 12 is about 14 inches long, first diameter 22 is about 0.750 inches and second diameter 24 is about 0.704 inches. In this embodiment, the distance from mid proximal position 20 to proximal end 14 is about 4.25 inches.

Constricting die 30 is a cylinder with distal end 32 and proximal end 34. A base member 36 is positioned at proximal end 34 to support die 30 in a press (not shown). Constricting die 30 has a center bore 38 that extends from distal end 32 to proximal end 34 and is sized to receive pin 12. Bore 38 will be described in more detail in FIG. 2A. In one embodiment, constricting die 30 is about 11.25 inches long, about 3.50 inches in diameter and base member is about 5.5 inches in diameter and about 1.5 inches high.

A tube of shape memory alloy 40 with outer diameter 22 matching the diameter of pin 12 is shown positioned between pin 12 and die 30 and aligned with bore 38. Tube 40 has distal end 42, proximal end 44 and bore 46. In one embodiment, tube 40 is a Nickel Titanium plug that is about 4 inches long with an outer diameter 22 of about 0.750 inches and bore 46 diameter of about 0.250 inches. The uncompressed perimeters and diameters of tube 40 are also known as memorized perimeters and diameters.

FIG. 2A through FIG. 2C are cross section views of constricting die and pin assembly 10 shown in FIG. 1, and illustrate an extrusion of tube 40 through constricting die and pin assembly 10. In FIG. 2A, bore 38 has a near proximal position 50 in constricting die 30 and a proximal end 52 at proximal end 34 of constricting die 30. The diameter of bore 38 tapers from diameter 22 at near proximal position 50 to reduced diameter 24 at proximal end 52 of bore 38. The reduced diameter 24 of pin 12 at mid proximal position 20 is sized to fit through proximal end 52 of bore 38. In one embodiment, the taper in bore 38 is about 1 degree from the center axis.

Tube 40 with an outer diameter 22, is inserted in the distal end 32 of bore 38. Tube 40 will rest at near proximal position 50 where bore 38 starts to taper to second diameter 24. Pin 12 is inserted in distal end 32 of bore 38 until proximal end 14 of pin 12 contacts distal end 42 of tube 40.

FIG. 2B illustrates downward movement of pin 12 in constricting die 30 represented by arrow 60. This movement is in response to pressure on enlarged end 18 by a press (not shown) or similar pressure inducing apparatus. Press pin 12 forces tube 40 proximally and past near proximal position 50 in bore 38. The taper in bore 38 to the second diameter 24 compresses tube 40 to outer diameter 24. In one embodiment, the pressure on enlarged end 18 is about 100,000 psi and the compressive radial force on tube 40 at second diameter 24 is about 200,000 psi.

FIG. 2C illustrates the constriction die and pin assembly 10 shown in FIG. 2A and FIG. 2B with further downward movement of pin 12 represented by arrow 62. Proximal end 14 of pin 12 is positioned at or beyond the proximal end 52 of bore 38. Tube 40 is extruded out of bore 38 as shown by arrow 64 and now has a reversible (deformed) outer diameter 24. The inner diameter of bore 46 in tube 40 is reduced proportionally. In one embodiment, tube 40 is made of Nickel-Titanium (NiTi) alloy, compressed up to 11% areal reduction or about 3% to 6% diameter reduction and preferably about 4% to 5%. In another embodiment, tube 40 has an outside diameter 24 of about 18 mm. In one mode, the compression of tube 40 takes place at about room temperature.

In a further embodiment, outer diameter 24 of tube 40 is about 3 millimeters and the diameter of bore 46 is about 1 millimeter. In a preferred embodiment, constricting die 30 is about 118 mm long press pin 12 is about 83 mm long and bore 38 is about 3.81 mm in diameter. Tube 40 is 3.81 mm outer diameter, with an inner bore 46 of 1.06 mm diameter, 12.7 mm long and is compressed (deformed) to an outer diameter of 3.58 mm and an inner diameter of about 1 mm.

In another embodiment of the invention (not shown) bore 38 and pin 12 are non-circular and tube 40 is extruded into a non-circular shape. In a further embodiment, bore 42 of tube 40 is non circular. In a still further embodiment contemplated (not shown), an expanding die with an expanding bore and a center tapered mandrel positioned in the expanded bore may be used to reversibly expand the inner diameter of a shape memory alloy tube 40.

In another embodiment (not shown), constricting die 30 is made from multiple components for ease of manufacture. In a further embodiment (not shown), bore 38 of constricting die 30 is flared at proximal end 52 to accommodate a small re-expansion of tube 40 in accordance with Young's Modulus.

Figure 3:
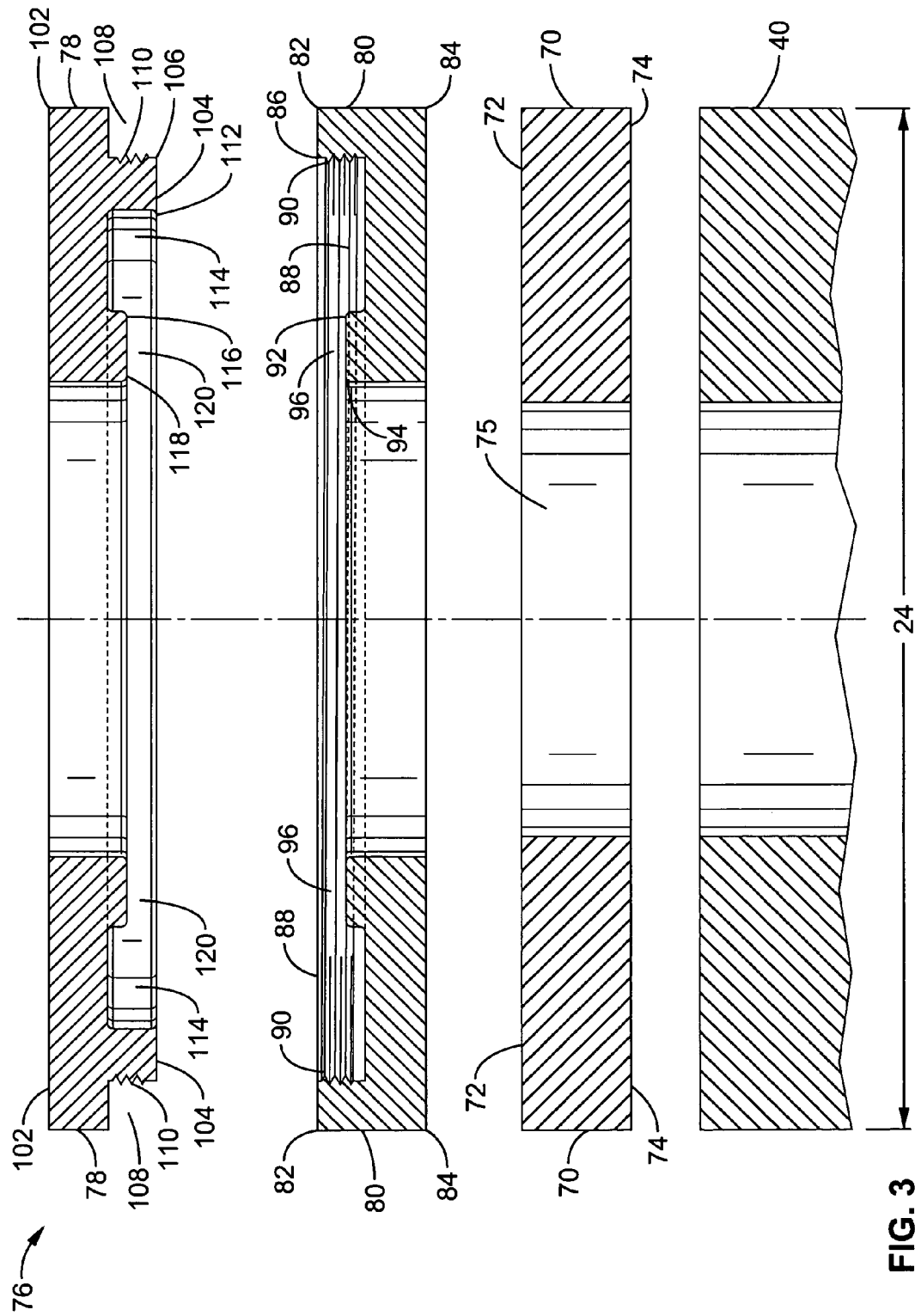
FIG. 3 is a cross section view of a reversibly compressed (deformed) tube of SMA as shown previously in FIG. 2C, with a one component embodiment and a two component embodiment of a sample holder configured to induce biaxial strain.

FIG. 3 is a cross section view of a reversibly compressed (deformed) tube 40 as shown previously in FIG. 2C with a reduced outer diameter shown by arrows 24. In the present embodiment, reduced outer diameter 24 is about 3 mm. An annular ring 70 is shown taken from tube 40 by cutting, machining or other conventional means. Ring 70 has distal and proximal surfaces 72, 74 and aperture 75. In one embodiment, ring 70 is an intermediate component of the invention or a blank for further machining.

In a further embodiment, ring 70 is a sample holder with an outer diameter of about 3 millimeters and aperture 75 about 1 to 2 millimeters in diameter. In one mode of this embodiment, the thickness of ring 70 is about 0.1 to about 0.25 millimeters. In another mode of the invention (not shown), a sacrificial wax, such as crystal bond, is applied to ring 70 to fill aperture 75 and form a wax disc. Distal surface 72 is polished with a tripod polisher or similar device that can provide a flat finish. In one mode, distal surface 72 and the wax disc in aperture 75 are polished flat. A thin film is applied to the polished distal surface 72 of ring 70 and to the polished surface of the wax disc in aperture 75. The film is applied using a deposition method such as vacuum deposition. After the film has been deposited, ring 70 is treated with acetone or other solvent to remove the wax from aperture 75. Ring 70 with the thin film attached is now ready for thin film strain experiments as will be discussed further in FIG. 4A and FIG. 4B. In one mode, the thin film is metal. In another mode, the thin film is a polymer, organic or a ceramic material.

Also shown in FIG. 3 is an exploded view of a sample holder, generally designated 76, with top ring 78 and bottom ring 80. Bottom ring 80 is made from a ring blank similar to ring 70 and has distal and proximal surfaces 82, 84 and a mid distal position 86 on distal surface 82 where an upper annular surface is formed between 86 and the outer circumference of bottom ring 80. An annular recess 88 in bottom ring 80 has an outer circumference defined by mid distal position 86. A set of female threads 90 is positioned in the annular wall of recess 88 defined by mid distal position 86. Recess 88 has an annular ridge with a width defined by position 92 and position 94 on the inner diameter of bottom ring 80. The annular ridge defined by position 92 and 94 is recessed from the upper surface of bottom ridge 80 by recess 96.

Top ring 78 is configured to mate with bottom ring 80 as will be illustrated in FIG. 4A. Top ring 78 is made from a ring blank similar to ring 70 and has distal and proximal surfaces 102, 104 and a mid proximal position 106 on proximal surface 104. An annular notch 108 in the outer circumference of top ring 78 is formed at mid proximal position 106. Male threads 110 are positioned on the wall of notch 108 and configured to mate with female threads 90 on bottom ring 80. Radially inward from mid proximal position 106 is second proximal position 112 that defines an annular recess 114 in proximal surface 104. Recess 114 has an inner annular ridge defined by position 116 radially inboard of position 112 and position 118 on inner circumference of top ring 78. The inner annular ridge between position 116 and 118 is further defined by recess 120 in proximal surface 104.

In another embodiment (not shown), male threads 110 and female threads 90 are replaced by adhesive, fasteners or mating pins for coupling top ring 78 and bottom ring 80.

In a further embodiment, the inner perimeter of tube 40 is non circular, thus ring blank 70, top ring 78 and bottom ring 80 are configured with a non-circular inner perimeter. In another embodiment, recess 88 in bottom ring 80 and recess 114 in top ring 78 are non circular. In a still further embodiment, recess 96 in bottom ring 80 and recess 120 in top ring 78 are non circular.

FIG. 4A and FIG. 4B illustrate the sample holder 76 shown in FIG. 3 with top ring 78 and bottom ring 80 coupled with male threads 110 and female threads 90. A circular thin film 132 is configured with an enlarged circumference member 134 and adapted to fit within annular recesses 88 and 114 (shown in FIG. 3) when top ring 78 and bottom ring 80 are coupled. Enlarged circumference member 134 is configured to force thin film 132 to change shape with a change in sample holder 76. In one embodiment, enlarged circumference member 134 is a plurality of silicon gaskets or other flexible material configured to grip thin film 132 and/or support thin film 132. Thin film 132 fits between the annular ridges defined by position 92, 94 in bottom ring 80 and 116, 118 in top ring 78 as shown in FIG. 3. In FIG. 4A, top ring 78 and bottom ring 80 are configured at reversibly deformed outer diameter 24.

In a preferred embodiment, outer diameter 24 of sample holder 76 is about 3 mm in diameter and adapted to fit a specimen holder (not shown) for a Transmission Electron Microscope (TEM). In one mode of this embodiment, the inner diameter of sample holder 76 is about 1 to 2 millimeters. In another mode, the thickness of sample holder 76 is about 0.1 to about 0.2 millimeters thick. In another embodiment, the specimen holder for the TEM is equipped for heating (not shown). In a further embodiment, the specimen holder is equipped for cooling.

In FIG. 4B, sample holder 76 has been subjected to a change in temperature 136 and has expanded to an outer diameter 140 designated by arrows 140. In one mode of this embodiment, sample holder 76 is heated to a temperature between the austenite start temperature of 78 deg. C. and the austenite finish temperature of 87 deg. C. of a NiTi alloy and diameter 24 in FIG. 4A expands by about 2.5%. In another mode, areal recovery of sample holder 76 is from 2% to 5%. In a further mode, sample holder 76 remains fixed at the expanded outer diameter 140 after returning to about room temperature from a heating step. In a still further mode, sample holder 76 is subjected to cooling to change its shape.

Sample holder 76 exerts outward radial forces designated by arrows 142 on enlarged circumference member 134 and causes thin film 132 to stretch radially as designated by arrows 144. These radial forces 142 put a biaxial strain through the plane of thin film 132. In one embodiment, outer diameter 140 of sample holder 76 is between outer (memorized) diameter 22 (shown in FIG. 2A) and reduced (deformed) outer diameter 24 shown in FIG. 4A. In another embodiment, outer diameter 140 of sample holder 76 is about equal to outer (memorized) diameter 22 (shown in FIG. 2A).

In another embodiment of the invention (not shown), enlarged circumference member 134 is non circular and adapted to fit within recesses 88 and 114 (shown in FIG. 3) which also are non circular. A sample holder with a non circular configuration, such as an oval or polygon, can impart asymmetrical biaxial strain on a thin film sample.

Referring back to FIG. 3, a change in temperature applied to ring 70 will impart a biaxial strain on a thin film deposited on distal surface 72 on ring 70 and suspended in aperture 75.

Figure 5:
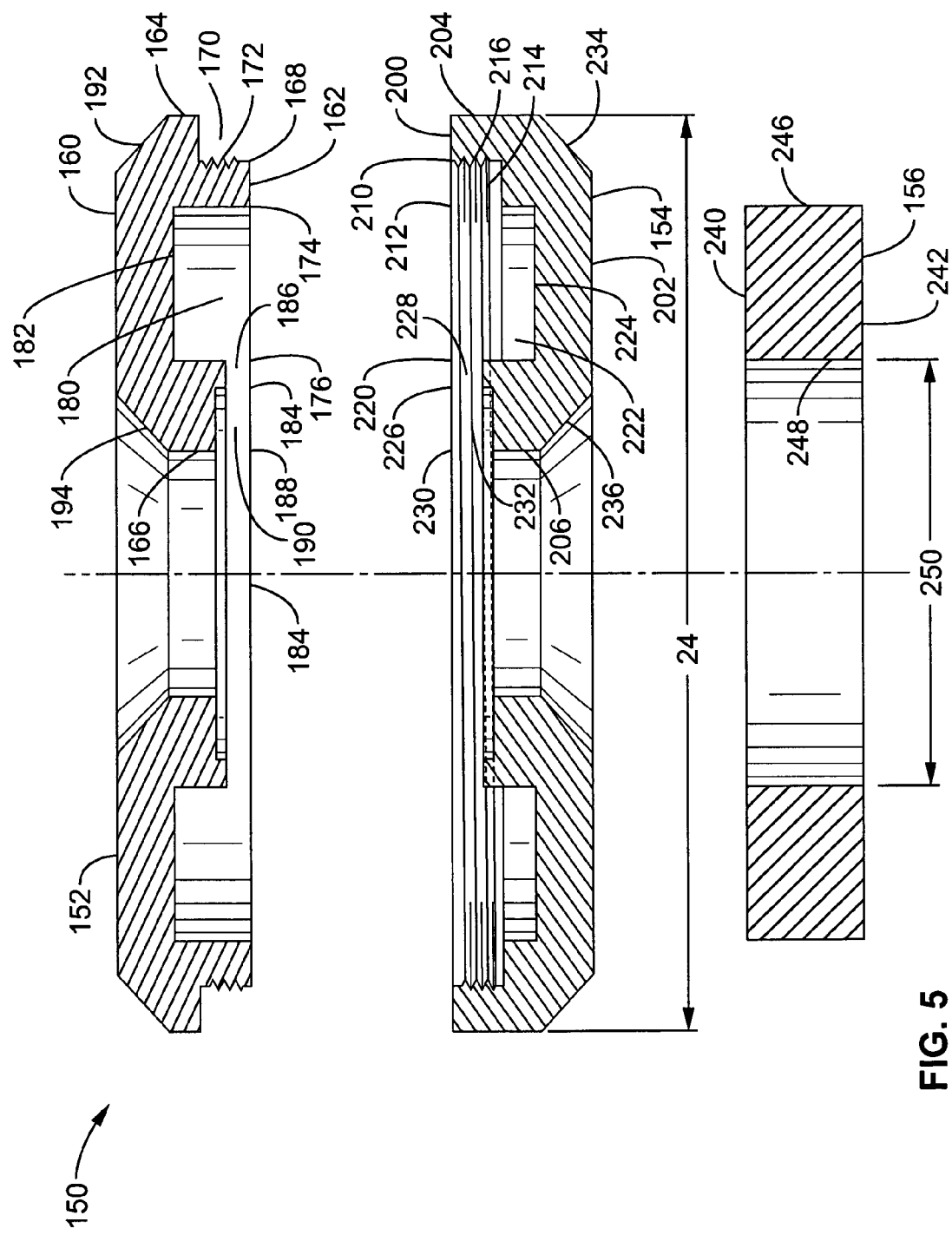
FIG. 5 is an exploded cross section view of another embodiment of a sample holder configured for reversible contraction and expansion.

FIG. 5 is an exploded cross section view of another embodiment of a sample holder 150 configured for both contraction and expansion. Sample holder 150 consists of top ring 152, bottom ring 154 and an inner ring 156.

Top ring 152 is made from a ring blank 70 as previously discussed in FIG. 3 and has distal surface 160, proximal surface 162, outer perimeter 164 and inner perimeter 166. A radial position 168 on proximal surface 160 and near outer perimeter 164 defines an annular notch 170 in the outer perimeter 164 of top ring 152. The wall of notch 170 has male threads 172. Radial position 174 on proximal surface 162 and inboard of radial position 168 and radial position 176 inboard of radial position 174 defines an annular recess 180 that has a predetermined depth to position 182 from proximal surface 156.

Proceeding radially inward from position 176 is position 184 that defines an annular recess 186 with a depth determined by the nature of a thin film sample. Proceeding radially inward from position 184, position 188 at the intersection of proximal surface 162 and inner perimeter 166 defines another recess 190 with a depth determined by the nature of the sample. The depth of recesses 186 and 190 will be different in different embodiments or for different samples. In this embodiment, top ring 152 has a bevel surface 192 at the intersection of outer perimeter 164 and distal surface 152 and a bevel surface 194 at the intersection of distal surface 152 and inner perimeter 166.

Bottom ring 154, made from a ring blank 70 as shown in FIG. 3, has distal surface 200, proximal surface 202, outer perimeter 204 and inner perimeter 206. Radial position 210 and radial position 212 inboard of position 210 on distal surface 200 defines a recess 214 where the outer wall of recess 214 has female threads 216. In general, position 210 aligns with position 168 on top ring 152 and female threads 216 are configured to mate with male threads 172 in top ring 152. Position 212 and a radial position 220 on distal surface 200 and inboard of position 212 defines a recess 222 with predetermined depth 224 measured from distal surface 200. Recess 222 in bottom ring 154 aligns with recess 180 in top ring 152. Radial position 226 on distal surface 200 inboard of position 220 defines a recess 228 configured to align with recess 186 in top ring 152. Position 226 and position 230 at the intersection of distal surface 200 and inner perimeter 206 define a recess 232 that aligns with recess 190 in top ring 152. The depth of recess 228 and 232 are determined by the nature of the sample to be examined. In this embodiment, bottom ring 154 has a bevel edge 234 on proximal surface 202 at the intersection of outer perimeter 204 and a beveled edge 236 at the intersection of proximal surface 202 and inner circumference 206. Top ring 152 and bottom ring 154 are made of a shape memory alloy and have a reversibly reduced diameter 24 as previously described in FIG. 2C.

Inner ring 156 is made from a different tube of SMA and has distal surface 240, proximal surface 242, outer perimeter 246 and inner perimeter 248. The cross section dimensions of inner ring 156 are configured to fit into the space defined by recess 180 in top ring 152 and recess 222 in bottom ring 154 when top ring 152 and bottom ring 154 are coupled, as will be shown in FIG. 6A and FIG. 6B. In one embodiment, inner ring 156 is a shape memory alloy, such as NiTi, with a non-deformed (memorized) inner diameter designated by arrows 250. In another embodiment, sample holder 150 is adapted to fit a specimen holder configured for a TEM.

Figure 6A:
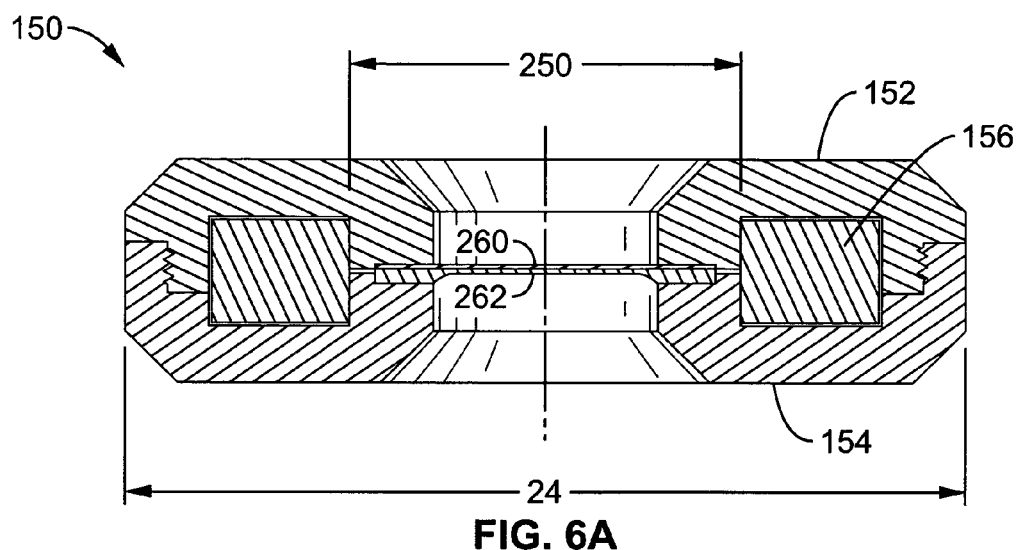
FIG. 6A illustrates a cross section view of the sample holder shown in FIG. 5 in an assembled configuration.
Figure 6B:
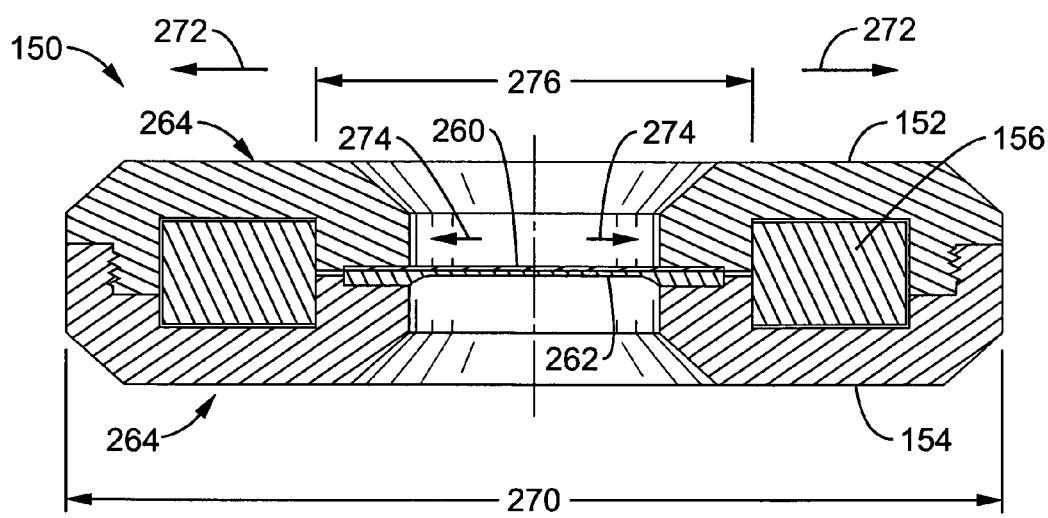
FIG. 6B is a cross section view of the sample holder shown in FIG. 6A configured to produce reversible biaxial expansion.
Figure 6C:
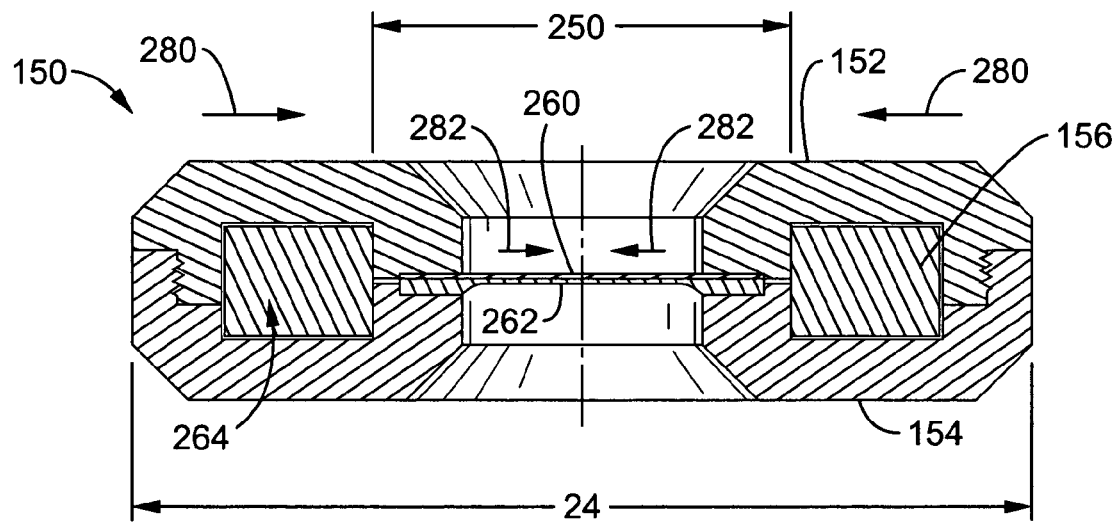
FIG. 6C is a cross section view of the sample holder shown in FIG. 6B configured to produce reversible biaxial contraction.

FIG. 6A through FIG. 6C illustrate a cross section view of the sample holder 150 shown in FIG. 5 configured to produce biaxial expansion and contraction. In FIG. 6A through FIG. 6C inner ring 156 is secured between coupled top ring 152 and bottom ring 154. In a preferred embodiment, inner ring 156 is electrically isolated from top and bottom ring 152, 154. A sample thin film 260 is mounted in the inner perimeters 166, 206 which form an aperture between top ring 152 and bottom ring 154. In this illustrated embodiment, a substrate 262 is used to support thin film 260. In a preferred embodiment, substrate 262 is about 0.03 mm thick. In another embodiment, substrate 262 is coupled to thin film 260. In FIG. 6A, top ring 152 and bottom ring 154 have reversibly deformed diameter 24 as shown by arrows 24 and discussed previously in FIG. 2C. Inner ring 156 has non-deformed (memorized) inner diameter 250 as shown by arrows 250.

FIG. 6B illustrates the configuration of sample holder 150 shown in FIG. 6A when a temperature change 264, such as heat, is selectively applied to coupled top ring 152 and bottom ring 154, such as with an electric current. Top and bottom rings 152, 154 expand to memorized outer diameter 270 as shown by movement arrows 272. Thin film 260 and/or substrate 262 are strained outward shown by movement arrows 274. Inner ring 156 is reversibly expanded to inner diameter 276 by the expansion of top and bottom rings 152, 154. Sample holder 150 will remain in this expanded position after the change in temperature 264 ceases.

FIG. 6C illustrates the configuration of the expanded sample holder 150 shown in FIG. 6B when temperature change 264, such as heat, is selectively applied to inner ring 156, such as with electric current. Because inner ring 156 is a shape memory alloy that has been reversibly expanded to inner diameter 276 as shown previously in FIG. 6B, selective temperature change 264 will cause inner ring 156 to contract toward non-deformed (memorized) diameter 250. This contraction, shown by movement arrows 280 causes top and bottom ring 152, 154 to contract towards their previous reversibly deformed outer diameter 24. The strain on thin film 260 and/or substrate 262 is changed as shown by movement arrows 282.

In a preferred mode, the expansion and contraction cycle on sample holder 150 shown in FIG. 6A through FIG. 6C is repeated to conduct biaxial fatigue analysis on thin film 260. In another mode, sample holder 150 is used to conduct bi-directional straining experiments. In another embodiment, top and bottom rings 152, 154 are reversibly contracted and inner ring 156 is reversibly expanded before assembly.

In one embodiment, top and bottom rings 152, 154 are electrically isolated from inner ring 156. In further contemplated embodiments (not shown), sample holder 150 is adapted to be an actuator instead of supporting thin film 262 and/or substrate 264. In a still further embodiment, the assembly of top and bottom rings 152, 154 with inner ring 156 is adapted to be an adjustable radial brake. In another embodiment, the assembly of top and bottom rings 152, 154 with inner ring 156 is adapted to be an adjustable radial collar. In a further embodiment, the assembly of top and bottom rings 152, 154 with inner ring 156 is adapted to be a removable, temperature actuated radial clamp. In a still further embodiment, the assembly of top and bottom rings 152, 154 with inner ring 156 is adapted to tune resonate RF cavities.

In another embodiment (not shown) top and bottom rings 152, 154 are configured with non circular inner perimeters. In a further embodiment, inner ring 156 is configured in a non circular shape adapted to mate with top and bottom rings 152, 154. A non circular configuration for sample holder 150, such as an oval or a polygon, can produce asymmetrical biaxial strain on a thin film sample. A non circular configuration for an actuator can be adapted to produce asymmetrical biaxial and radial forces and movements.

Figure 7:
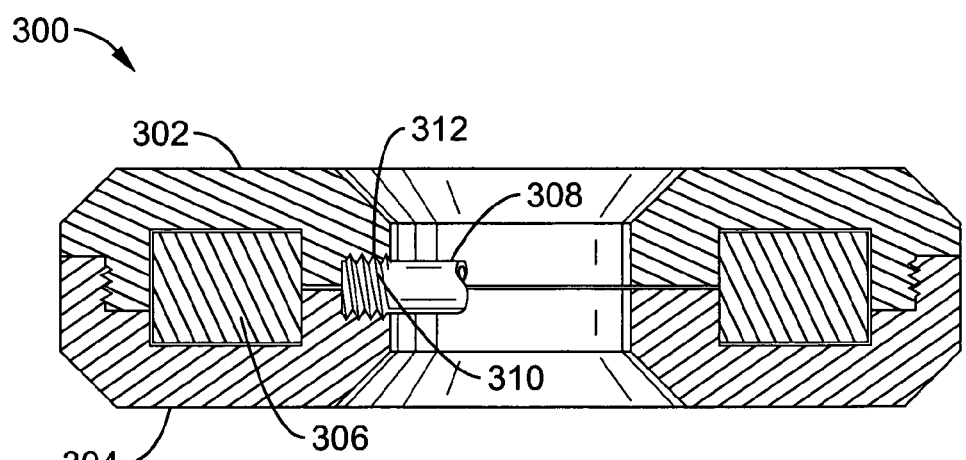
FIG. 7 is a cross section view of another embodiment of the reversible ring system shown in FIG. 5 configured as the prime mover of an actuator.

FIG. 7 illustrates another embodiment of the invention shown in FIG. 5 through FIG. 6C as a cross section view through a ring system 300 consisting of a top ring 302, a bottom ring 304, and in inner ring 306 configured as the prime mover of an actuator. In one mode, ring system 300 is an actuator in a micro-electromechanical system (MEMS). An actuator member 308 is shown coupled to ring system 300 with male threads 310 that mate with female threads 312 between top and bottom ring 302, 304. In one mode, actuator member 308 is coupled to the inside of ring system 300 as shown. In another mode of this embodiment (not shown), actuator member 308 is coupled to the outside of ring system 300. In a further mode (not shown) a plurality of actuator members 308 are coupled to ring system 300. In a still further mode, ring system 300 is non circular.

Figure 8:
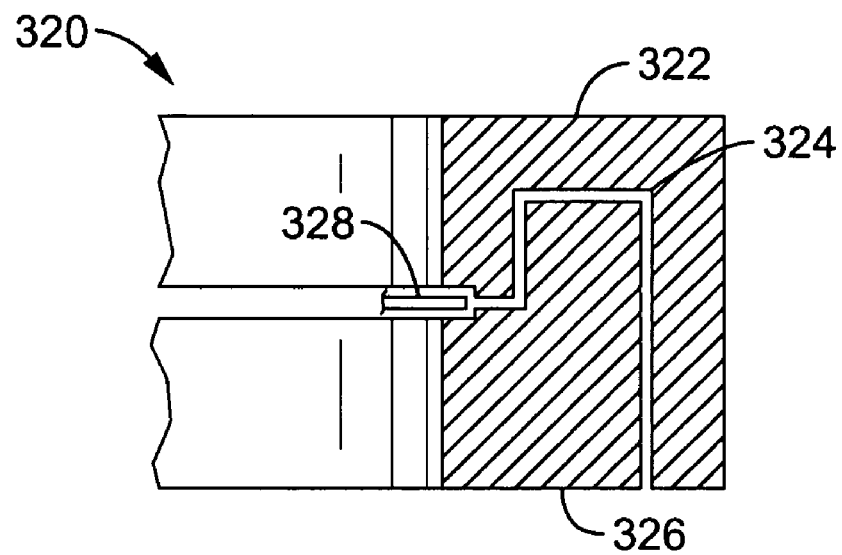
FIG. 8 illustrates a cross section view of another embodiment of a ring assembly configured to reversibly contract and expand.

FIG. 8 illustrates a further embodiment of the invention in a cross section view of a portion of ring assembly 320. Ring assembly 320 has outer ring 322 with annular recess 324 and inner ring 326 adapted to fit in recess 324. In one mode, outer ring 322 is reversibly expanded and inner ring 326 is reversibly contracted before assembly. Outer and inner ring 322, 326 can be coupled by threads as discussed previously in FIG. 6A through FIG. 6C or by other conventional means. Thin film 328 is secured between outer ring 322 and inner ring 326. In another mode of this embodiment, thin film 328 is replaced by an actuator member coupled to ring assembly 320 in a manner similar to that discussed previously in FIG. 7. In a further mode of this embodiment, outer ring 332 is electrically isolated from inner ring 326. In another mode, ring assembly 320 is configured as a reversible radial actuator in a MEMS. In a still further mode, ring assembly 320 is an oval, a polygon, or other non circular shape.

Figure 9:
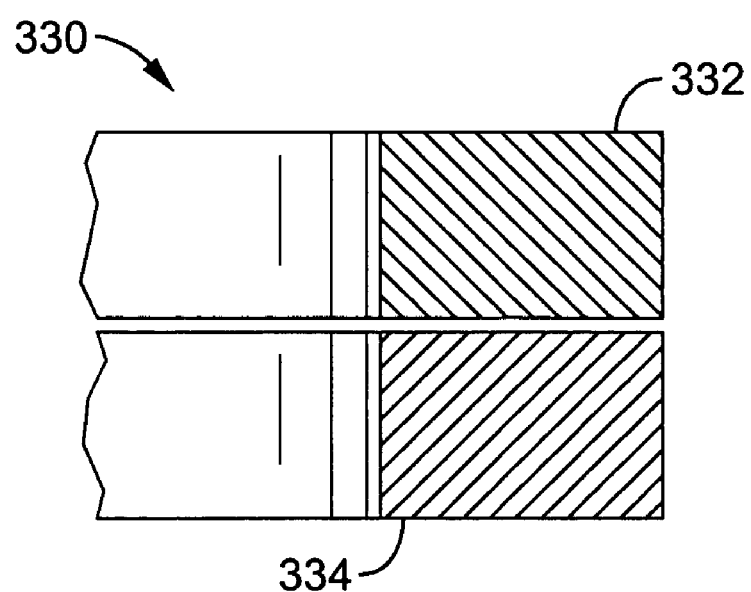
FIG. 9 illustrates a cross section view of a further embodiment of a ring assembly configured to reversibly contract and expand.

FIG. 9 illustrates another embodiment of the invention in a cross section view of a portion of ring assembly 330. Ring assembly 330 has top ring 332 and bottom ring 334. In one mode, top ring 332 is reversibly expanded and bottom ring 334 is reversibly contracted before assembly. Top and bottom ring 332, 334 are coupled together by threads, adhesive, fasteners, mating pins or other conventional coupling means. In one mode, a plurality of actuator members (not shown) are coupled to ring assembly 330 in a manner similar to that previously described in FIG. 7 and FIG. 8. In another mode, ring assembly 330 is a reversible radial collar, clamp or brake. In a further mode of this embodiment, top ring 332 is electrically isolated from bottom ring 334. In another embodiment, ring assembly 330 is a reversible radial actuator in a MEMS. In a further embodiment, ring assembly 330 is non circular.

Figure 10:
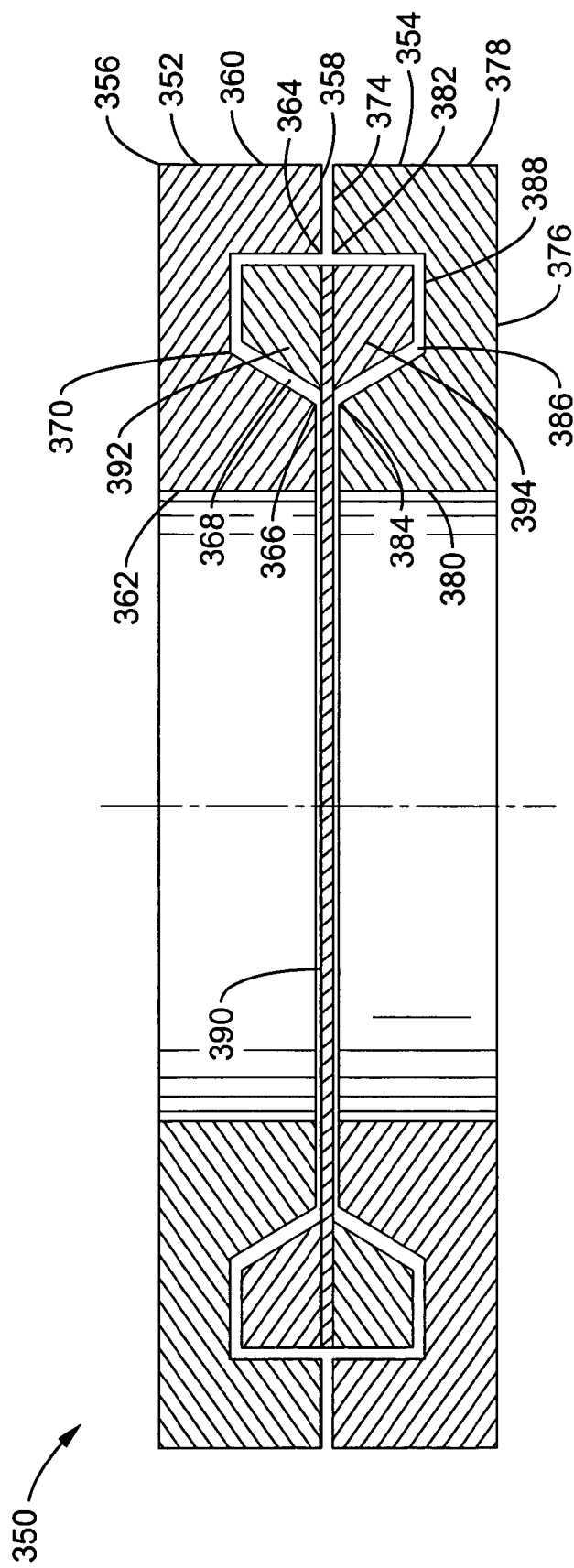
FIG. 10 is a cross section view of another embodiment of a sample holder configured to induce biaxial strain on a thin film.

FIG. 10 illustrates another embodiment of a sample holder designated 350. Sample holder 350 has top ring 352 and bottom ring 354 adapted to align and couple. Top ring 352 and bottom ring 354 are coupled with adhesive, fasteners, mating pins, interlocking surfaces or other conventional means. Top ring 352 has distal surface 356, proximal surface 358, outer perimeter 360 and inner perimeter 362. Radial position 364 on proximal surface 358 and radial position 366 inboard of position 364 define an annular recess 368 with a trapezoidal cross section and a predetermined depth at position 370.

Bottom ring 354 has distal surface 374, proximal surface 376, outer perimeter 378 and inner perimeter 380. Radial position 382 on proximal surface 374 and radial position 384 inboard of position 376 define an annular recess 386 with a trapezoidal cross section and a predetermined depth at position 388. Thin film 390 is sandwiched between beveled annular gasket 392 secured in recess 368, and beveled annular gasket 394 secured in recess 386.

In one mode, gaskets 392, 394 grip thin film 390 and transfer strain as a result of shape change of top ring 352 and bottom ring 354. In another mode, gaskets 392, 394 are made of silicon or other flexible material to produce uniform, radial strain. In a further mode, gaskets 392, 394 stretch in response to the strain on thin film 390. In a still further mode, outer perimeters 360, 378 are about 3 mm in diameter and inner perimeters 362, 380 are about 1 mm to about 2 mm in diameter. In a still further embodiment, inner perimeters 362, 380 are non circular.

In another embodiment, top ring 352 is reversibly contracted and bottom ring 354 is reversibly expanded before coupling. In one mode of this embodiment, gaskets 392, 394 are coupled to respond as one enlarged perimeter member on thin film 390. In another mode of this embodiment, top ring 352 and bottom ring 354 or electrically isolated. In a further mode, temperature change is applied to top ring 352 or bottom ring 354 with electric current.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for adjustably changing biaxial strain on a thin film, comprising:
    a ring of shape memory alloy having a first inner perimeter;
    wherein said ring has been reversibly changed to a second inner perimeter; and
    means for securing a thin film to said ring;
    wherein said ring adjusts between said second and said first inner perimeter in response to a change in temperature applied to said ring; and
    wherein said ring is adapted to impart biaxial strain on said thin film in response to a change between said second and said first inner perimeter of said ring.

2. An apparatus as recited in claim 1, wherein said shape memory alloy comprises Nickel Titanium.

3. An apparatus as recited in claim 1, wherein said means for securing a thin film comprises:
    a top portion and a bottom portion in said ring;
    wherein said top portion has a first continuous groove;
    wherein said bottom portion has a second continuous groove;
    wherein said first continuous groove is adapted to align with said second continuous groove;
    wherein said first continuous groove and said second continuous groove are adapted to grip a thin film; and
    means for coupling said top portion and said bottom portion of said ring.

4. An apparatus as recited in claim 3:
    wherein said first continuous groove in said top portion is configured in a first shape;

wherein said second continuous groove in said bottom portion is configured in said first shape; and wherein said first shape is selected from the group consisting essentially of a circle, an oval and a polygon.

5. An apparatus as recited in claim 3, further comprising:
a plurality of gaskets adapted to couple to said thin film;
wherein said gaskets are further adapted to grip said thin film;
wherein said gaskets are further adapted to align with said first continuous groove and said second continuous groove; and
wherein said gaskets are configured to change biaxial strain on said thin film in response to a change between said second inner perimeter and said first inner perimeter of said ring.

6. An apparatus as recited in claim 3, wherein said means for coupling comprises:
a circular ridge in said top portion of said ring;
said circular ridge in said top portion of said ring having male threads;
a circular recess in said bottom portion of said ring;
said circular recess in said bottom portion of said ring having female threads;
wherein said male threads on said top portion are adapted to mate with said female threads on said bottom portion; and
wherein said top portion of said ring is coupled to said bottom portion of said ring when said male threads are securely engaged with said female threads.

7. An apparatus as recited in claim 3, further comprising:
a first continuous recess in said top portion of said ring;
a second continuous recess in said bottom portion of said ring;
wherein said first continuous recess of said top portion is adapted to align with said second continuous recess of said bottom portion of said ring;
a counter ring adapted to align with said first continuous recess in said top portion and said second continuous recess in said bottom portion;
wherein said counter ring is further adapted to fit securely between said first and second continuous recesses when said top and bottom portions are coupled;
said counter ring made of shape memory alloy;
said counter ring having a first outer perimeter;
said counter ring having a reversibly changed second outer perimeter;
wherein said counter ring reversibly changes from said first outer perimeter to said second outer perimeter when said ring adjusts between said second and said first inner perimeter in response to a change of temperature applied to said ring; and
wherein said ring reversibly changes from said first inner perimeter to said second inner perimeter when said counter ring adjusts between said second and said first outer perimeter in response to a change of temperature applied to said counter ring.

8. An apparatus as recited in claim 7:
wherein said first continuous recess in said top portion is configured in a first shape;
wherein said second continuous recess in said bottom portion is configured in said first shape;
said first outer perimeter of said counter ring is configured in said first shape; and
wherein said first shape is selected from the group consisting essentially of a circle, an oval and a polygon.

9. An apparatus as recited in claim 7:
wherein said counter ring is electrically isolated from said ring;
wherein temperature of said ring changes in response to electric current applied to said ring; and;
wherein temperature of said counter ring changes in response to electric current applied to said counter ring.

10. An apparatus as recited in claim 7, wherein said ring is configured to be a prime mover of a reversible radial actuator.

11. An apparatus as recited in claim 1, wherein said means for securing a thin film comprises:
a top surface and a bottom surface in said ring;
wherein said second inner perimeter of said ring is adapted to hold a removable wax disc;
wherein said removable wax disc has at least a top surface;
wherein said removable wax disc is temporarily positioned in said second inner perimeter of said ring; and
wherein said top surface of said ring and said top surface of said removable wax disc are adapted to receive a thin film.

12. An apparatus as recited in claim 1, further comprising:
a counter ring of shape memory alloy coupled to said ring;
said counter ring having a first outer perimeter;
said first outer perimeter of said counter ring adapted to align with said second inner perimeter of said ring;
wherein said counter ring has a reversibly changed second outer perimeter;
wherein said second outer perimeter of said counter ring is adapted to align with said first inner perimeter of said ring;
wherein said counter ring reversibly changes between said first outer perimeter and said second outer perimeter in response to said ring changing between said second and said first inner perimeter in response to changing the temperature of said ring; and
wherein said ring reversibly changes between said first inner perimeter and said second inner perimeter in response to said counter ring changing between said second and said first outer perimeter in response to changing the temperature of said counter ring.

13. An apparatus as recited in claim 12:
wherein said counter ring is electrically isolated from said ring;
wherein temperature of said ring changes in response to electric current applied to said ring; and
wherein a change in temperature of said counter ring changes in response to electric current applied to said counter ring.

14. An apparatus as recited in claim 12, wherein:
said second inner perimeter of said ring is configured in a first shape; and
wherein said first shape is selected from the group consisting essentially of a circle, an oval and a polygon.

15. An apparatus as recited in claim 1, wherein said device is adapted to be positioned in a specimen holder of a transmission electron microscope.

16. An apparatus as recited in claim 1:
wherein said thin film is supported on a substrate; and
wherein said substrate is coupled to said ring.

17. An apparatus as recited in claim 1, wherein said first inner perimeter of said ring is up to about five percent larger than said second inner perimeter of said ring.

18. An apparatus as recited in claim 1, wherein said ring is adapted to be reversibly changed from said first inner perimeter to said second inner perimeter at about room temperature.

19. An apparatus as recited in claim 1, wherein the temperature of said ring is changed by applying electric current to said ring.

20. An apparatus as recited in claim 1, wherein said ring is configured to be a prime mover of a radial actuator.

21. An apparatus adapted to reversibly change its shape comprising:
a first ring of shape memory alloy having a first inner perimeter;
wherein said first ring has been reversibly changed to a second inner perimeter;
a second ring of a shape memory alloy coupled to said first ring;
said second ring having a first outer perimeter;
said first outer perimeter of said second ring adapted to align with said second inner perimeter of said first ring;
wherein said second ring has a reversibly changed second outer perimeter;
wherein said second outer perimeter of said second ring is adapted to align with said first inner perimeter of said first ring;
wherein said second ring changes between said first and said second outer perimeter in response to said first ring changing between said second and said first inner perimeter in response to changing temperature of said first ring; and
wherein said first ring changes between said first and said second inner perimeter in response to said second ring changing between said second and said first outer perimeter in response to changing temperature of said second ring.

22. An apparatus as recited in claim 21, wherein said shape memory alloy comprises Nickel Titanium.

23. An apparatus as recited in claim 21:
wherein said first ring is electrically isolated from said second ring;
wherein temperature of said first ring changes in response to electric current applied to said first ring; and;
wherein temperature of said second ring changes in response to electric current applied to said second ring.

24. An apparatus as recited in claim 21:
wherein said ring device is further adapted to support a thin film; and
wherein a change between said second inner perimeter and said first inner perimeter of said first ring imparts a change in biaxial strain on said thin film.

25. An apparatus as recited in claim 24:
wherein said thin film is supported on a substrate; and
said substrate is coupled to said first ring.

26. An apparatus as recited in claim 21, wherein said ring device is further adapted to be positioned in a specimen holder of a transmission electron microscope.

27. An apparatus as recited in claim 21:
wherein said second inner perimeter of said first ring is configured in a first shape; and
wherein said first shape is selected from the group consisting essentially of a circle, an oval and a polygon.

28. An apparatus as recited in claim 21, wherein said first inner perimeter of said first ring is up to about six percent larger than said second inner perimeter of said first ring.

29. An apparatus as recited in claim 21, wherein said first ring is adapted to be reversibly changed from said first inner perimeter to said second inner perimeter at about room temperature.

30. An apparatus as recited in claim 21, wherein said ring device is configured as a prime mover of a reversible radial actuator.

31. An apparatus as recited in claim 21, wherein said ring device has an outer diameter of about 3 millimeters when said first ring has said second inner perimeter.

32. An apparatus for adjustably changing biaxial strain on a thin film, comprising:
a ring of Nickel Titanium alloy having a first inner perimeter;
wherein said ring has been reversibly changed to a second inner perimeter;
wherein said ring changes between said second and said first inner perimeter in response to changing temperature of said ring;
said ring has a top surface and a bottom surface;
wherein said second inner perimeter of said ring is adapted to hold a removable wax disc;
wherein said removable wax disc has at least a top surface;
wherein said removable wax disc is temporarily positioned in said second inner perimeter of said ring;
wherein said top surface of said ring and said top surface of said removable wax are adapted to receive a thin film; and
wherein biaxial strain on said thin film changes in response to a change between said second and said first inner perimeter of said ring.

33. An apparatus as recited in claim 32:
wherein said top surface of said ring and said top surface of said removable wax disc are polished; and
wherein said thin film is a metal.

34. An apparatus as recited in claim 32, wherein said ring is adapted to be positioned in a specimen holder of a transmission electron microscope.

35. An apparatus as recited in claim 32, wherein said first inner perimeter of said ring is up to about five percent larger than said second inner perimeter of said ring.

36. An apparatus for adjustably changing biaxial strain on a thin film, comprising:
a ring of Nickel Titanium alloy having a first inner perimeter;
wherein said ring has been reversibly changed to a second inner perimeter;
said ring adapted to support a thin film;
wherein said ring adjusts between said second and said first inner perimeter in response to changing temperature of said ring; and
wherein biaxial strain on said thin film changes in response to a change between said second and said first inner perimeter of said ring.

37. An apparatus as recited in claim 36, wherein:
said second inner perimeter of said ring is configured in a first shape; and
wherein said first shape is selected from the group consisting essentially of a circle, an oval and a polygon.

38. An apparatus as recited in claim 36, wherein said device adapted to be positioned in a specimen holder of a transmission electron microscope.

39. An apparatus as recited in claim 36:
wherein said thin film is supported on a substrate; and
said substrate is coupled to said ring.

40. An apparatus as recited in claim 36, wherein said first inner perimeter of said ring is up to about five percent larger than said second inner perimeter of said ring.

41. An apparatus as recited in claim 36, wherein said ring is adapted to be reversibly changed from said first inner perimeter to said second inner perimeter at about room temperature.

42. An apparatus as recited in claim 36, wherein temperature of said ring changes in response to electric current applied to said ring.

* * * * *